(12) United States Patent
Connor, Jr.

(10) Patent No.: US 8,429,009 B2
(45) Date of Patent: Apr. 23, 2013

(54) UNIVERSAL AFFINITY SYSTEM

(75) Inventor: Robert W. Connor, Jr., San Diego, CA (US)

(73) Assignee: Paycode Inc., Henderson, NV (US)

( * ) Notice: Subject to any disclaimer, the term of this patent is extended or adjusted under 35 U.S.C. 154(b) by 584 days.

(21) Appl. No.: 12/174,267

(22) Filed: Jul. 16, 2008

(65) Prior Publication Data

US 2010/0017279 A1 Jan. 21, 2010

(51) Int. Cl.
*G06Q 30/00* (2012.01)

(52) U.S. Cl.
USPC .................................................. 705/14.3

(58) Field of Classification Search .................. None
See application file for complete search history.

(56) References Cited

U.S. PATENT DOCUMENTS

| | | | |
|---|---|---|---|
| 5,930,767 A | 7/1999 | Reber et al. | |
| 6,129,274 A | 10/2000 | Suzuki | |
| 6,144,848 A | 11/2000 | Walsh et al. | |
| 6,189,787 B1 | 2/2001 | Dorf | |
| 6,837,436 B2 | 1/2005 | Swartz et al. | |
| 7,318,049 B2 | 1/2008 | Iannacci | |
| 7,328,844 B2 | 2/2008 | Workens | |
| 7,556,193 B1 * | 7/2009 | Amsterdam et al. | 235/380 |
| 2001/0034717 A1 | 10/2001 | Whitworth | |
| 2001/0051915 A1 | 12/2001 | Ueno et al. | |
| 2002/0013728 A1 | 1/2002 | Wilkman | |
| 2002/0046116 A1 | 4/2002 | Hohle et al. | |
| 2002/0060246 A1 | 5/2002 | Gobburu et al. | |
| 2002/0065728 A1 | 5/2002 | Ogasawara | |
| 2002/0071076 A1 | 6/2002 | Webb et al. | |
| 2002/0082920 A1 | 6/2002 | Austin et al. | |
| 2002/0145043 A1 | 10/2002 | Challa et al. | |
| 2002/0179709 A1 | 12/2002 | Mehler | |
| 2003/0158818 A1 | 8/2003 | George et al. | |
| 2003/0233320 A1 | 12/2003 | Connor, Jr. | |
| 2004/0006510 A1 | 1/2004 | Lertzman et al. | |
| 2004/0049425 A1 | 3/2004 | Bakker et al. | |
| 2004/0054581 A1 | 3/2004 | Redford et al. | |
| 2005/0021400 A1 | 1/2005 | Postrel | |
| 2005/0187820 A1 | 8/2005 | Mohan | |
| 2006/0026073 A1 | 2/2006 | Kenny, Jr. et al. | |
| 2006/0224454 A1 | 10/2006 | Kantor et al. | |
| 2006/0293960 A1 | 12/2006 | Iannacci | |
| 2007/0005416 A1 | 1/2007 | Jackson et al. | |
| 2007/0150411 A1 | 6/2007 | Addepalli | |

(Continued)

FOREIGN PATENT DOCUMENTS

| | | |
|---|---|---|
| EP | 1182599 A1 | 2/2002 |
| GB | 2362012 | 11/2001 |

(Continued)

OTHER PUBLICATIONS

Phoenix Technologies, Loyalty Center, www.phoenix-tec.com/products/loyalty-central, Apr. 10, 2008, 4 pages.

(Continued)

*Primary Examiner* — Olabode Akintola
(74) *Attorney, Agent, or Firm* — Woodcock Washburn LLP

(57) ABSTRACT

An improved universal affinity system and method is uniquely configured to be implemented and operated with a reduced impact on existing merchant point of sale and affinity systems. The improved system and method also enables merchants to provide highly targeted incentives and advertising to users of the universal affinity system.

21 Claims, 9 Drawing Sheets

U.S. PATENT DOCUMENTS

| | | |
|---|---|---|
| 2007/0162337 A1* | 7/2007 | Hawkins et al. ............... 705/14 |
| 2007/0192182 A1 | 8/2007 | Monaco et al. |
| 2008/0011837 A1 | 1/2008 | Wesley |
| 2008/0052172 A1 | 2/2008 | Cohagan et al. |
| 2008/0065495 A1 | 3/2008 | Nguyen |
| 2008/0097783 A1 | 4/2008 | Ianucci |
| 2008/0097853 A1* | 4/2008 | Kim et al. .................... 705/14 |
| 2008/0109304 A1* | 5/2008 | Sarelson et al. ............... 705/14 |
| 2008/0235091 A1* | 9/2008 | Holliday ....................... 705/14 |

FOREIGN PATENT DOCUMENTS

| | | |
|---|---|---|
| WO | WO 9806055 | 2/1998 |
| WO | WO 0028455 | 5/2000 |
| WO | WO 0060484 | 10/2000 |
| WO | WO 0115034 A1 | 3/2001 |
| WO | WO 0155907 A2 | 8/2001 |
| WO | WO 02073481 A2 | 9/2002 |

OTHER PUBLICATIONS

"Prio and Mchigan National to Offer Online Promotions Program to 30,000 Merchants", Business Wire, Sep. 28, 1999, 7 pages.

Ondrus, et al., "Coupling Mobile Payments and CRM in the Retail Industry", 2004, http://hec.unil.ch/yp/Pub/04-IADIS.pdf, 8 pages.

Stegemann, et al., "Networks, Alliances and Loyalty Programs in Australia: Power not Passion Drives the Affair", Competitive Paper, IMP20, http://www.impgroup.org/uploads/papers/4589.pdf, 20 pages.

Schuman, E., "Restaurants Using Credit Card as their Loyalty Card", StorefrontBackTalk, Apr. 3, 2008, http://storefrontbacktalk.com/story/040308loyalty, 19 pages.

* cited by examiner (Enrollment Processing – Partner Entity)

(Enrollment Processing – Universal Mgmt. Server)

(Incentive Routing – Universal Mgmt. Server)

UNIVERSAL AFFINITY SYSTEM

BACKGROUND

Individual merchant-based affinity systems are in widespread use, as are affinity programs that are tied to a particular method of payment, such as a credit card. Examples of merchant-based affinity systems include Best Buy's Reward Zone program, Staples' Rewards program, and Barnes&Noble's Member program. Examples of affinity programs that are tied to a particular method of payment include, for example, the Membership Rewards® program of American Express. Typically, customers must sign up for each affinity program (or always use the same method of payment) and carry identification cards or key fobs for multiple programs. Also, affinity data is limited to customer purchase activities at a single merchant or through a single method of payment. Moreover, customers must share personal information with each merchant when enrolling in an affinity program, potentially subjecting the customer to unwanted spam or junk mail.

There have been attempts to provide a more universal approach to affinity programs, but those attempts have still required customers to sign up for each affinity program separately and to obtain separate identifications for each system, or they have required the merchants and retailers to give up control over their affinity programs and transaction data to another entity.

SUMMARY

An improved universal affinity system and method described and claimed herein is uniquely configured to be implemented and operated with a reduced impact on existing merchant point of sale and affinity systems. The improved system and method also enables merchants to provide highly targeted incentives and advertising to users of the universal affinity system.

In one embodiment, the system is used by a first entity to provide to customers of an entity that partners with the first entity, universal access to affinity systems of a plurality of merchants. The first entity allocates to the partner entity a plurality of universal identifiers and the partner entity issues a respective one of the universal identifiers to each of a plurality of customers. The system comprises a universal management server that receives from the partner entity, on behalf of its customers, requests from the customers to activate their respective universal identifiers. In response to each such request, the universal management server allocates memory on the universal management server to create a personal account locker for the customer and automatically enrolls the customer in the affinity systems of one or more merchants. Each merchant accepts the same universal identifier of the customer as an identifier within the merchant's affinity system. The universal management server may then receive from one of the merchants information comprising an incentive and the universal identifier(s) of one or more customers who are to receive the incentive. In response, the server may store the information comprising the incentive in the personal account lockers of the customer(s) having the received universal identifiers. A customer may be provided access to his or her personal account locker via a website hosted by the partner entity. A link may be provided from the partner website to the personal account locker on the universal management server.

Thus, the universal affinity system and method may allow a customer to avoid carrying and presenting paper coupons and multiple merchant affinity cards. The system may also enable the merchants/retailers to leverage their existing affinity systems with new customers and to increase customer acquisition for their affinity programs. Merchants have the ability to offer incentives to a much larger group of customers than the group of customers available to the merchant through its individual affinity program. Because each merchant operates its own affinity system, the merchants can target incentives to customers based on any of their own criteria, such as offering incentives only to customers who have a history of buying particular classes of products, live in a particular geographic area, or shop in particular types of stores. That is, merchants may leverage their existing affinity systems to truly target individuals based on actual purchasing habits, while running incentives on items "known to be of interest" to the individual. The system may also provide retailers with enhanced visibility and the ability to quickly inform customers (both existing and possible new customers) with visual and descriptive information on incentives being made available to the particular customer or all customers via their personal account lockers. A merchant may also avoid adding substantial software to its point-of-sale systems and may avoid routing transaction data out to secondary (i.e., non-affiliated parties) for process or approval.

BRIEF DESCRIPTION OF THE DRAWINGS

The foregoing summary and the following detailed description are better understood when read in conjunction with the appended drawings. For the purpose of illustrating the improved universal affinity system and method, there is shown in the drawings exemplary embodiments of various aspects of the system and method; however, the invention is not limited to the specific methods and instrumentalities disclosed. In the drawings, wherein like numerals indicate like elements.

DETAILED DESCRIPTION OF ILLUSTRATIVE EMBODIMENTS

The ensuing detailed description provides exemplary embodiments only and is not intended to limit the scope, applicability, or configuration of the invention. Various changes may be made in the function and arrangement of elements and steps without departing from the spirit and scope of the invention.

Figure 1:
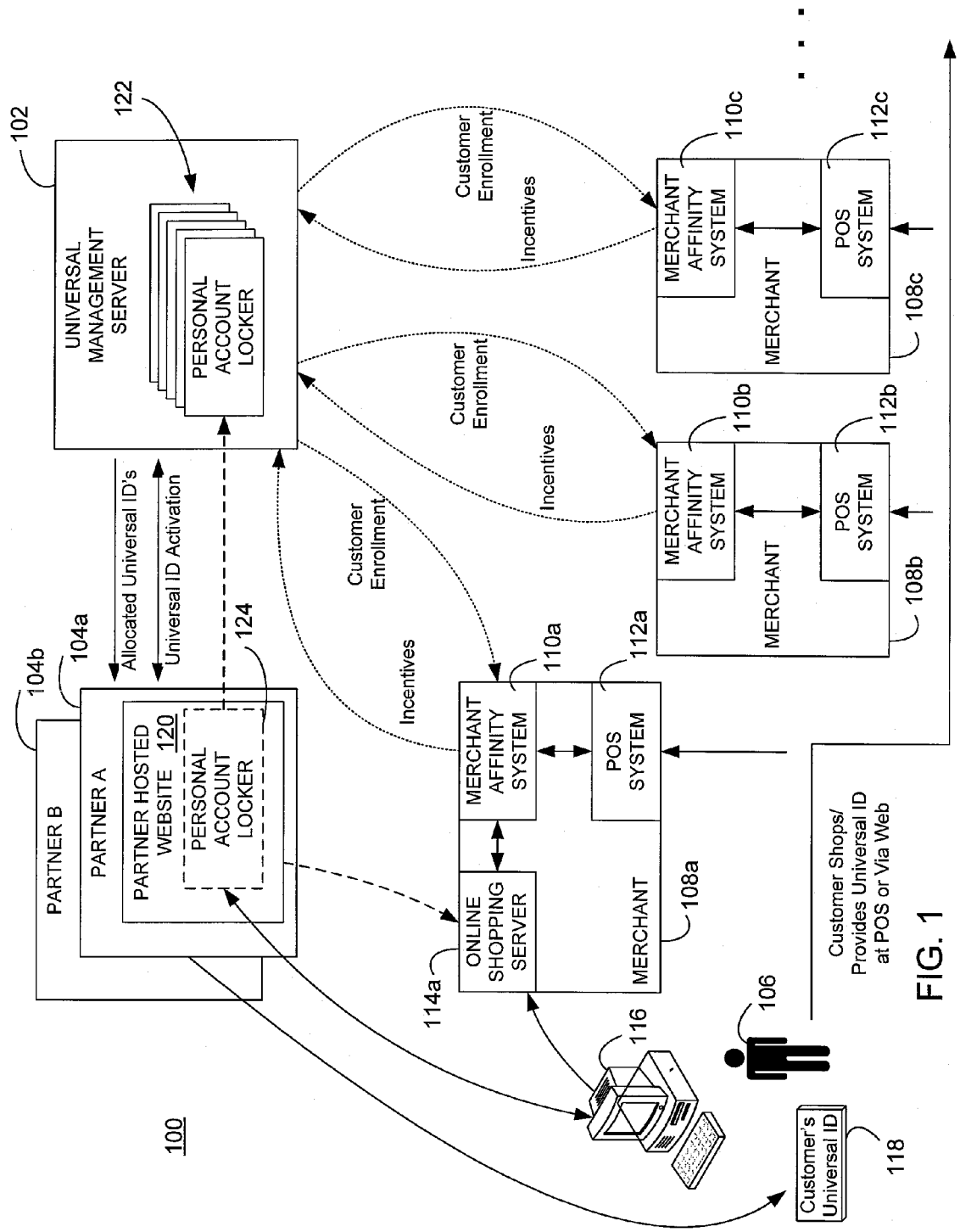
FIG. 1 is a block diagram of one embodiment of a universal affinity system.

FIG. 1 is a block diagram illustrating one embodiment of a universal affinity system 100. In this embodiment, a first entity operates a universal management server 102 to provide to customers of one or more entities 104a, 104b that partner with the first entity, universal access to affinity systems 110a, 110b ... 110c of a plurality of participating merchants 108a, 108b ... 108c. Such partner entities may be credit card issuers, debit card issuers, mobile phone service providers, automobile manufacturers, Internet service providers, internet search engine providers, or other product or service providers. The first entity that operates the universal management server 102, hereinafter referred to as the "management entity," may be an entity unrelated to any of the partner entities or it may be one of the partner entities. In one embodiment, the management entity may be a consortium or association of merchants.

The system 100 enables a customer, e.g., customer 106, of one of the partner entities, e.g., partner 104a, to use a universal identifier (ID) 118 that has been issued to that customer by the partner entity whenever purchasing items or services at various ones of the participating merchants 108a ... 108c and to have that universal ID recognized by each merchant's own merchant affinity system 110a ... 110c. In this manner, the customer does not have to carry a separate ID for each different merchant affinity system.

Additionally, the system 100 enables a merchant to determine incentives, such as discounts, advertisements, or other offers, for a given customer or set of customers using the merchant's own affinity system and based on the merchant's own point-of-sale (POS) transaction data, and then to have those incentives uploaded to respective "personal account lockers" of those customers (e.g., personal account lockers 122) hosted by the universal management server 102.

Each partner entity hosts a website 120 that its customers may log into to activate their universal IDs and to access their personal account lockers. A web page of the partner website will, in one embodiment, provide each customer with a link 124 (e.g., URL) to the customer's respective personal account locker 122 on the universal management server. Communications between a customer's computer 116 and a partner hosted website 120 may take place over a network, such as the Internet or any other network connecting the two. Communications between the partner hosted website 120 and the universal management server 102, and communications between the universal management server 102 and the affinity systems 110a ... 110c, may also take place over a network, such as the Internet or a private network.

In one embodiment, the system generally operates as follows. The management entity, for example, the management entity's universal management server 102, generates a number of unique, universal IDs, each of which is intended to be used by a customer as an identifier of the customer in the universal affinity system 100. In one embodiment, each universal ID (e.g., universal ID 118) comprises a unique numerical or alpha-numerical identifier that may be encoded in a variety of different ways, such as as a bar code, as information stored on a magnetic stripe (such as on a credit or debit card), as information stored on a wireless device, such as a FOB wand, mobile telephone, personal digital assistant (PDA), or the like. An example universal ID may be: "123A 45BC 6789 DEFG H123."

In an embodiment in which the universal ID is encoded as a bar code, the bar code may be provided to a corresponding customer on a variety of different media, such as on an adhesive label that the customer may apply to another device or item, printed on a credit or debit card, printed on a key-chain card, or printed on any other device or item that a customer may be likely to carry with him or her. In one embodiment, the universal ID may be an existing identifier of the customer issued by a different entity (i.e., one that is not one of the management, partner or merchant entities of the affinity system) that is then recognized by the management entity, partner entities and merchants as a universal ID in the universal affinity system 100, such as, for example, the bar code identifier on a driver's license, health insurance card, gym membership card, passport or other item associated with the customer.

The management entity then allocates a number of universal IDs to each partner entity 104a, 104b. Each partner entity may then issue a universal ID to each of, or to a selected group of, its customers, such as customer 106, along with an invitation for the customer to activate the universal ID and begin participating in the universal affinity system. In some embodiments, the management entity may issue the universal IDs to customers on behalf of the partner entity(ies).

A customer wishing to participate in the system may log on to a website hosted by the partner entity (e.g., website 120) and to proceed through an activation process. As described more fully below, the customer may enter information about himself or herself, in the form of a customer profile, and may also enter the universal ID issued to the customer and which the customer wishes to activate.

The partner entity may then transmit the customer's profile and universal ID to the universal management server 102 with a request to activate that universal ID for use by the customer. In response to the request, the universal management server 102 may create a personal account locker on the server for the customer (e.g., one of the personal account lockers 122) and may associate the customer's universal ID with that personal account locker. The personal account locker may comprise a portion of memory on the universal management server that has been allocated to the customer.

As an additional part of the activation process, which is described more fully below, the universal management server may automatically enroll the customer in the affinity systems 110a ... 110b of one or more merchants 108a ... 108c. In one embodiment, each merchant agrees to accept the universal ID of a customer as an identifier within that merchant's own affinity system. This avoids the need for the customer to have a separate identifier for each merchant affinity system.

In one embodiment, the management entity and a partner entity may be the same entity. In such a case, that single entity alone may perform the functions described herein of both the management entity and server and a partner entity and server. In such a case, that single entity may generate and issue universal IDs to customers. There may or may not be other partner entities in such a scenario.

Once the universal ID of the customer has been activated and the customer has been enrolled in one or more merchant affinity systems, the user may purchase goods and services at, for example, retail locations of the merchants or via online shopping websites (e.g., website 114a) operated by the merchants. At a retail location, a customer may have his or her universal ID entered into the point-of-sale (POS) system (e.g., POS system 112a, 112b ... or 112c) of the participating merchant at the time of consummating a purchase transaction. The universal ID may be entered in any of a variety of ways, such as by scanning a bar code representation of the universal ID at a terminal of the merchant's POS system, by swiping a magnetic stripe containing information representing the universal ID, by entering a sequence of numeric or alphanumeric digits representing the universal ID, or by any other suitable means. Information about the customer's transaction may then be stored by the merchant's affinity system in an account associated with the universal ID. In this manner, the customer may accumulate "points" or other awards or incentives based on the customer's transaction history, as is conventional in a given merchant affinity system.

At some point in time, for example after a certain level of transaction activity has been reached by one or more customers at a given participating merchant 108a, 108b . . . 108c, the merchant may desire to target incentives at those customer(s). As used herein and in the claims, the term "incentive" refers to all types of incentives, advertising, promotions, discounts or other offers to a customer. The system 100 enables the merchant to communicate with the universal management server to upload a particular incentive(s) to the universal server along with one or more universal IDs (e.g., a "batch" of universal IDs) associated with the customer(s) who the merchant wishes to receive the particular incentive. The incentives and universal IDs may be uploaded via an electronic communication between the merchant's affinity system and the universal management server, or in other embodiments, the universal management server may provide a website that a merchant may log into to manually enter information about an incentive and the universal IDs of customers who are to receive the incentive.

In response to the uploading of a particular incentive and one or more universal IDs, the universal management server 102 may then route the incentive (or information representing or describing the incentive) to the personal account lockers 122 associated with the universal ID(s) received from the merchant, and the incentive is then stored in each of those personal account lockers. In this manner, each merchant is able to target particular incentives to one or more customers.

Thus, the universal affinity system 100 may allow a customer to avoid carrying and presenting paper coupons and multiple merchant affinity cards. The system may also enable the merchants/retailers to leverage their existing affinity systems with new customers and to increase customer acquisition for their affinity programs. Merchants have the ability to offer incentives to a much larger group of customers than the group of customers available to the merchant through its individual affinity program. Because each merchant operates its own affinity system, the merchants can target incentives to customers based on any of their own criteria, such as offering incentives only to customers who have a history of buying particular classes of products, live in a particular geographic area, or shop in particular types of stores. That is, merchants may leverage their existing affinity systems to truly target individuals based on actual purchasing habits, while running incentives on items "known to be of interest" to the individual. The system may also provide retailers with enhanced visibility and the ability to quickly inform customers (both existing and possible new customers) with visual and descriptive information on incentives being made available to the particular customer or all customers via their personal account lockers. A merchant may also avoid adding substantial software to its point-of-sale systems and may avoid routing transaction data out to secondary (i.e., non-affiliated parties) for process or approval.

Figure 2:
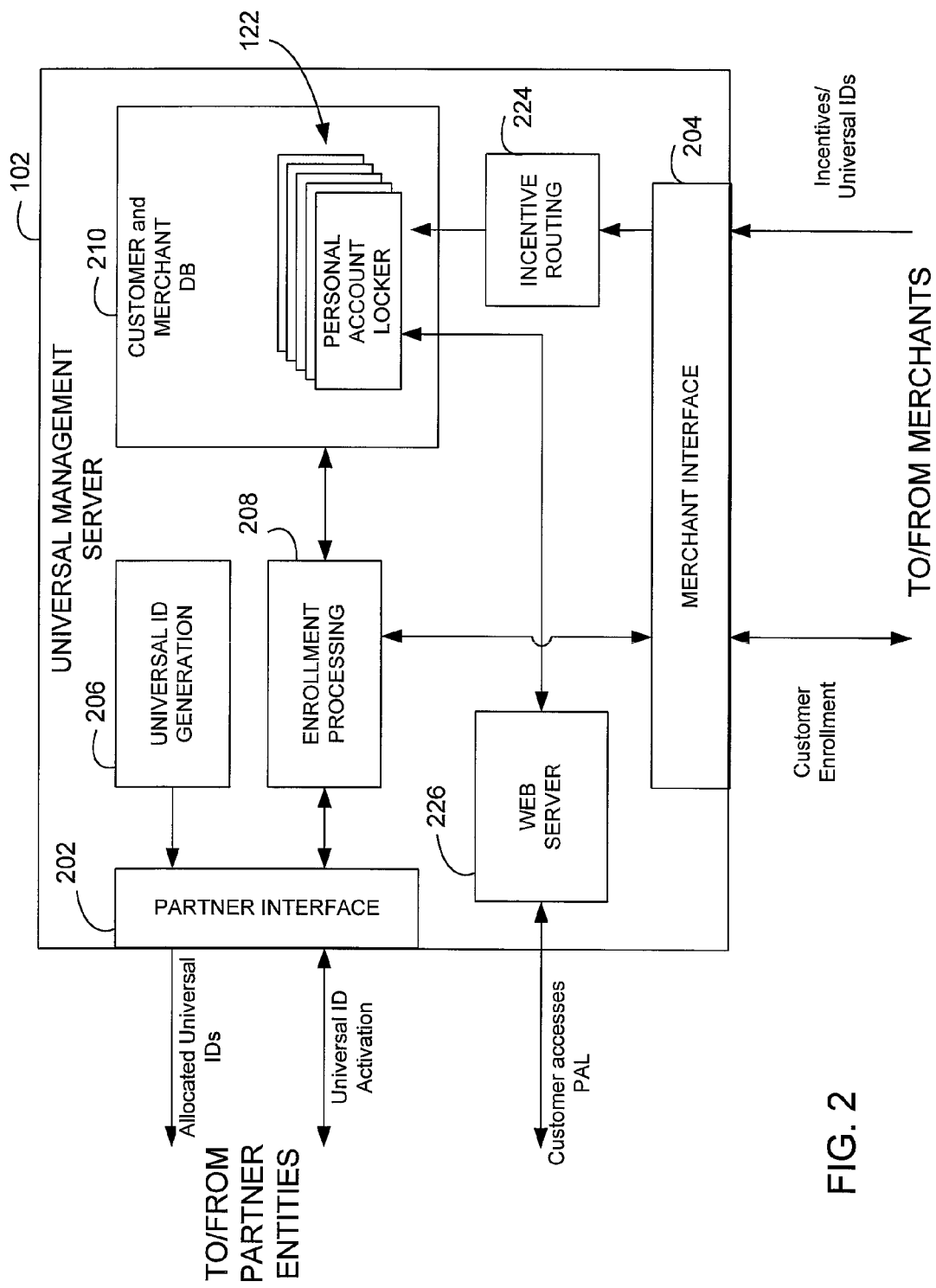
FIG. 2 is a block diagram providing further details of one embodiment of a universal management server.

FIG. 2 is a block diagram providing further details of one embodiment of a universal management server. As shown, the universal management server 102 may include an interface 202 for handling communications between the universal management server and a server operated by a partner. Similarly, the server 102 may include an interface 204 for handling communications between the universal management server and a merchant affinity system. In one embodiment, the interfaces 202 and 204 implement the necessary communications protocols (e.g., HTTP, TCP/IP, Ethernet and the like) needed to communicate with the partners and merchants over whatever network infrastructure (e.g., the Internet, a WAN, a LAN etc.) connects them. The interfaces 202, 204 may also provide application programming interfaces that other applications or software executing on the server 102 can invoke to cause the desired communications to occur.

The universal management server 102 may further include a process 206 that generates unique universal IDs and allocates sets of the universal IDs to different partner entities (e.g., entities 104a and 104b). In other embodiments, generation of universal IDs may be performed by another server or method either by the management entity or by another entity on behalf of the management entity. In one embodiment, a portion of each universal ID allocated to each partner entity may be used to identify that partner entity in order distinguish the universal IDs allocated from one partner from those allocated to a different partner. In this manner, the universal management server upon receipt of a particular (and unique) universal ID from a customer, partner entity or merchant would be able to distinguish which partner entity issued that universal ID to the customer.

The universal management server 102 may also include an enrollment process 208 that handles universal ID activation on behalf of a customer and handles customer enrollment in the affinity systems of various merchants 108a, 108b . . . 108c. The enrollment processing 208 performed by one embodiment of the universal management server is described in greater detail below in connection with FIG. 5.

A database 210 may be hosted by the universal management server 102 to store information about customers who have successfully enrolled in the universal affinity system and to store information about the participating partner entities and participating merchants. The database may include portions of storage or memory allocated to represent each personal account locker 122 created on the server 102. In other embodiments, the personal account lockers 122 may comprise storage or memory allocated outside of the customer/merchant/partner database 210. Also, in other embodiments, the database 210 may be stored on a different computing system to which the universal management server 102 would then access to obtain information.

The universal management server 102 may also include an incentive routing process 224 that routes incentives uploaded to the server 102 by a merchant to the personal account lockers 122 of customers identified by the merchant as those who are to receive those incentives. The incentive routing process 224 performed by one embodiment of the universal management server is described in greater detail below in connection with FIG. 5.

Still further, the universal management server 102 may include a web server 226, or other application, module or process, that provides a customer access to the incentive information stored in the customer's personal account locker.

Figure 3:
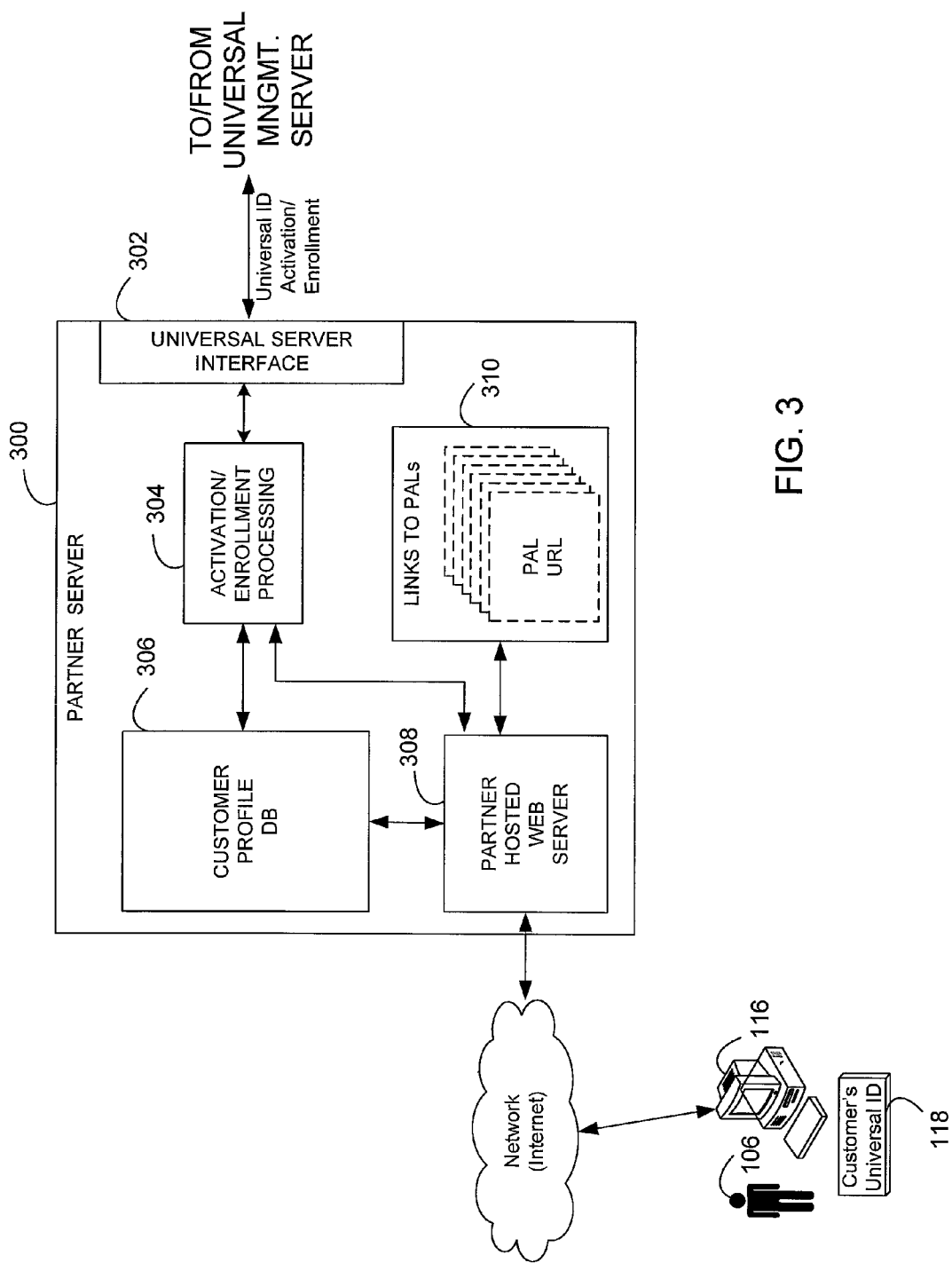
FIG. 3 is a block diagram providing further details of one embodiment of a partner server.

FIG. 3 is a block diagram providing further details of one embodiment of a server 300 that may be operated by one of the partner entities. As shown, the partner server 300 may include an interface 302 that enables or facilitates communications between the partner server 300 and the interface 202 of the universal management server 102. In addition, the partner server may maintain a database of information concerning its customers. The information may be stored in the form of a profile for the customer. An activation/enrollment process 304 handles, from the perspective of the partner entity, the activation of a customer's universal ID and enrollment in the universal affinity system. The activation/enrollment processing 304 performed by one embodiment of the partner server is described in greater detail below in connection with FIG. 4.

The partner server 300 may further include a web server 308 that hosts a web site to which customers of the partner entity may log on and that provides links 310 from the web site hosted by the web server 308 to the respective personal account lockers 122 on the universal management server 102. In this manner, the personal account lockers of the customers may appear to be a part of the web site hosted by the partner entity. In one embodiment, each link is in the form of a uniform resource locator (URL).

Figure 4:
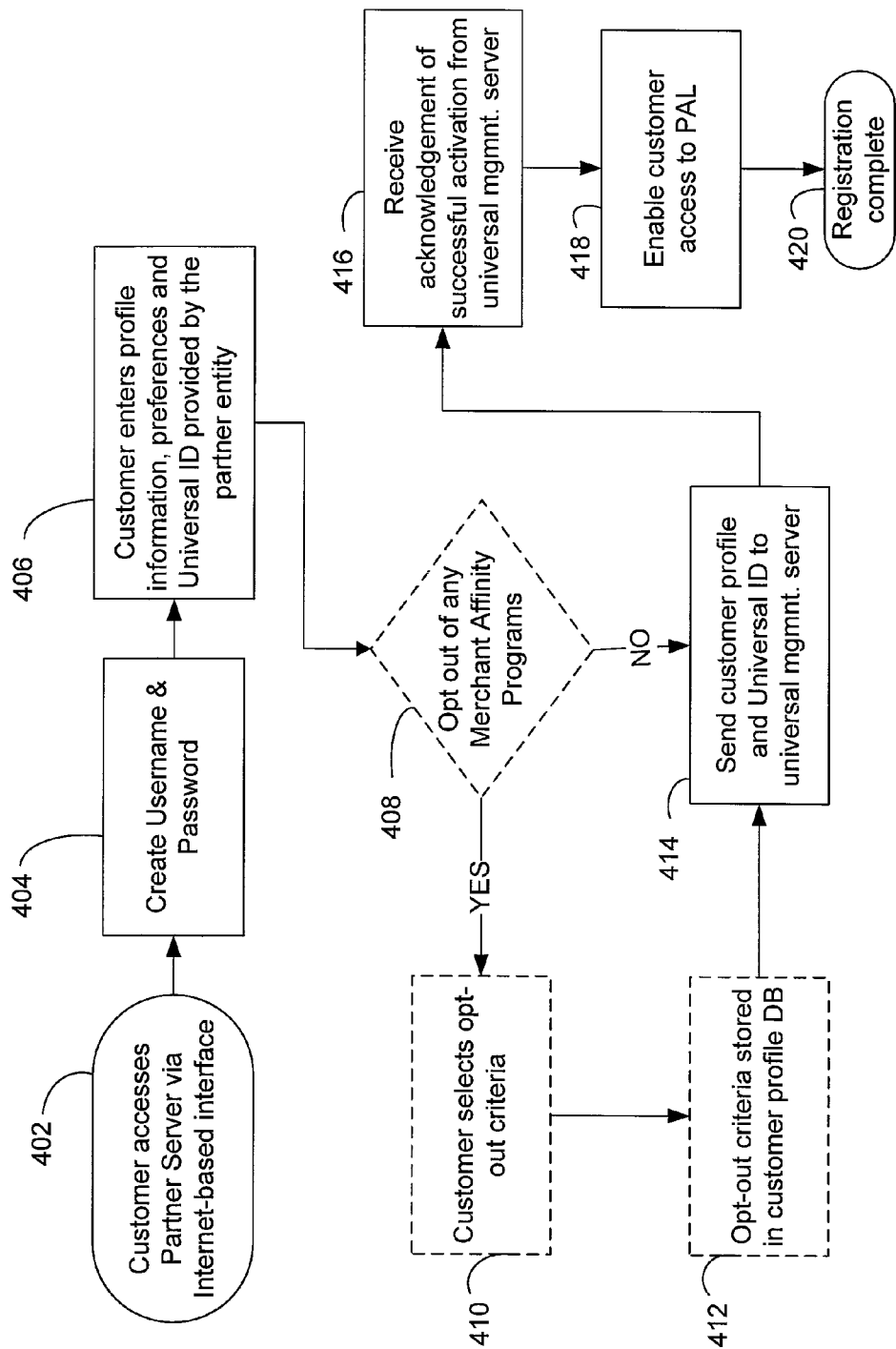
FIG. 4 is a flow diagram of one embodiment of a method for activating a universal identifier of a customer on a partner server.

In order for a customer to participate in the universal affinity system, on-line activation/enrollment may be required. FIG. 4 is a flow diagram of one embodiment of a method for activating a universal ID of a customer on a partner server, such as server 300 of FIG. 3. The steps illustrated in FIG. 4 may, for example, be the steps performed by the activation/enrollment process 304 illustrated in FIG. 3. In this embodiment, prior to attempting to activate a universal ID, the customer will have been issued the universal ID by the partner entity. For example, in the case where a partner entity comprises a credit or debit card issuer, the issuer may have provided the customer with a new credit card on which a bar code representation of the universal ID has been printed. Alternatively, the universal ID may have been encoded on the magnetic stripe of the new credit card. As still another alternative, the credit card company may have mailed to the customer some other form of media, such as an adhesive label, that the customer would then apply to his or her credit card or to any other suitable item. In other embodiments, the partner may provide a special card bearing the universal ID. And, as mentioned above, in yet other embodiments, an identifier issued to the customer by another entity (such as the bar code on a customer's driver's license—and the numeric or alpha-numeric value it represents) is used as the universal ID that the customer must then activate in the universal affinity system.

As shown in FIG. 4, in step 402, the customer accesses the partner server (e.g., partner server 300) through an internet-based interface. For example, the customer may log onto the website 120 hosted by a partner. An internet-based interface is used in this embodiment because of wide spread access and high comfort level to a wide variety of customers. Other types of interfaces could be provided, for example, an interface provided through a mobile phone or a telephone-based registration process using a customer service representative.

After accessing the interface, the customer may create a user name and password, represented by step 404. At step 406, the customer may enter profile information and preferences. Profile information may include the customer's name, mailing address and e-mail address, and may include other information, such as purchasing habits and/or affinities. Preferences may include, for example, privacy preferences, the preferred means of communication with the customer, as well as which types of incentives the customer may desire to receive or not receive. Preferences may also allow the customer to select how customer communications will be transmitted, for example, by e-mail, mail or to a mobile phone. The customer may also enter the universal ID (for example, the numeric or alphanumeric digits of the identifier) that has previously been issued to the customer by the partner entity. It is this universal ID that will be activated for the customer.

In one embodiment, the customer may be automatically enrolled in the affinity systems of all of the participating merchants. However, in another embodiment, as represented by steps 408, 410 and 412 (shown in dashed lines), the customer may be given the option to opt out of individual merchant affinity programs, as represented by step 408. If the customer elects to opt out of specific programs, the customer may select those programs that he or she wishes to opt out of and may be given the option to opt-out based on particular criteria, for example, to exclude merchants that only offer goods in a particular category that is not of interest to the customer or are located outside of the customer's normal shopping region. The customer's selection of opt out criteria is represented by step 410. Once the customer has completed selecting opt out criteria, the opt out criteria and/or selections may be noted as part of the information in the customer's profile, as shown in step 412.

In step 414, the partner server sends the universal ID entered by the customer, along with the customer's profile (including any merchant affinity system opt-out selections) to the universal management server 102. After the universal management server has activated the universal ID and effectively enrolled the customer in the universal affinity system, the partner server will receive an acknowledgment of successful activation/enrollment from the universal management server 102, as shown at step 416. In response, the partner server may then enable the customer to access the customer's personal account locker. For example, the partner server may provide an HTML link on the website hosted by web server 308 that the customer can click to access the personal account locker. The HTML link may be implemented as a URL that causes a web browser of the customer to connect to the web server 226 on the universal management server to provide access to the personal account locker on the universal management server. However, it may appear to the customer as if the personal account locker resides with the partner entity. Once access to the customer's personal account locker has been enabled, the activation/enrollment process is essentially complete, as shown at step 420.

Figure 5:
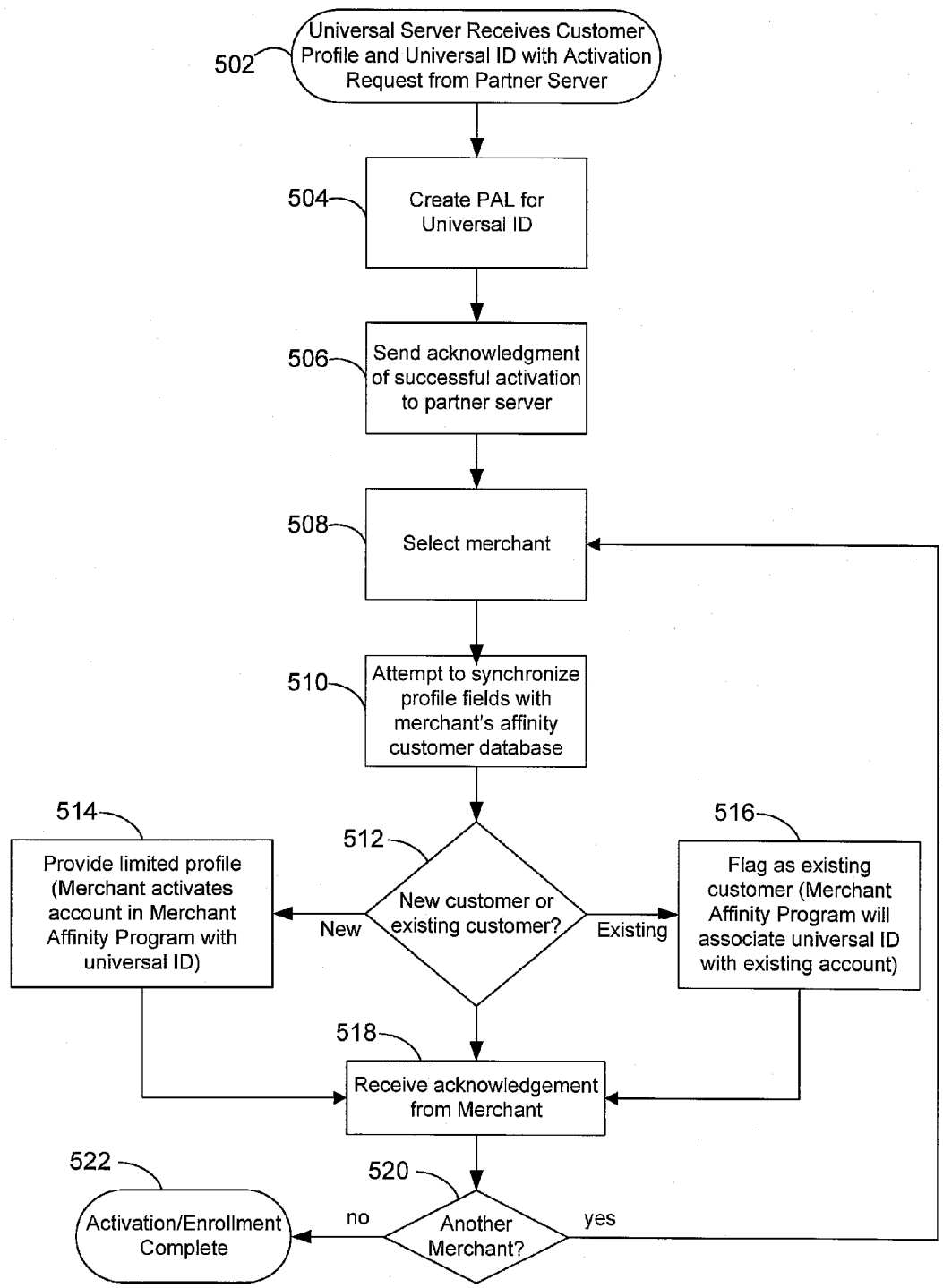
FIG. 5 is a flow diagram of one embodiment of a method for activating a universal identifier of a customer on the universal management server.

FIG. 5 is a flow diagram of one embodiment of a method for activating a universal identifier of a customer on the universal management server 102. The steps illustrated in FIG. 5 may, for example, implement the enrollment process 208 of the universal management server 102. As shown in FIG. 5, at step 502 the server 102 receives a request to activate a customer's universal ID, along with the customer's profile and the universal ID itself. This is the information transmitted, for example, in step 414 of FIG. 4.

In step 504, the server 102 creates a personal account locker for the customer and associates the customer's universal ID with the account locker. In one embodiment, the personal account locker comprises memory that is allocated for the personal account locker in order to store information representing the incentives uploaded to the customer by one or more merchants. It is understood that there are many ways to allocate such memory, and the invention is not limited on any one method. For example, in one embodiment, the personal account locker may comprise a field or fields allocated within a relational database.

In step 506, the server 102 sends an acknowledgement of successful activation or enrollment back to the partner entity (e.g., partner server 300). The server then performs a process of automatically enrolling the customer in one or more of the affinity systems of participating merchants. It is understood that in other embodiments, the step 506 of sending an acknowledgement of successful activation/enrollment may be sent after the customer has been enrolled in the affinity systems of participating merchants or after enrollment in some pre-defined number of merchant affinity systems has been completed.

The process of enrollment begins at step 508 where a merchant is selected for customer enrollment. In step 510, the universal management server 102 attempts to determine whether the particular customer is already a member of the merchant's affinity system or not. In one embodiment, this is performed by attempting to synchronize fields of the customer's profile with corresponding fields of the database of the merchant's affinity system. For example, the universal management server 102 may interrogate the merchant's affinity system whether a 'LAST NAME' field of the customer's profile matches any accounts in the merchant affinity system that have a corresponding 'LAST NAME' field. If there are any matches, then the server 102 may move to the 'FIRST NAME' field of the customer's profile and interrogate the merchant's affinity system to determine if any of the accounts with matching 'LAST NAME' fields also have matching 'FIRST NAME' fields. If there are matches, then the server 102 may move to an 'ADDRESS' or 'PHONE NUMBER' field, and so on. This process may continue until there is only one matching account identified in the merchant's affinity system and there has been sufficient field matching for the system to conclude that the customer is an existing member of the merchant's affinity system. Rules for determining when there is sufficient matching may be programmable and may be different for different merchants. Also, the particular fields involved in the comparison and the order in which they are compared may also be programmed and may also vary from merchant to merchant.

As shown in step 512, if the customer has been determined by the process described above to be an existing member of the merchant's affinity system, then at step 516 the server 102 may flag the customer as an "existing" customer of that merchant in the universal management server database 210 and may request the merchant's affinity system to associate the customer's universal ID with the existing account for the customer in the merchant's affinity system. The server 102 may then wait for receipt of an acknowledgement from the merchant's affinity system (step 518). If there are other merchant affinity systems in which the customer is to be enrolled (step 520) then control will pass back to step 508 to select the next merchant and the process will be repeated for that merchant. If enrollment in all of the participating merchant affinity systems (or all of the ones for which the customer did not otherwise opt out) is complete, then the activation/enrollment process is complete as shown at step 522.

If in step 512 the customer has not been identified as a existing member in the merchant's affinity system, i.e., the customer will be a new member, then in step 514 the universal management server 102 may flag the customer as a "new" customer for that merchant in the universal management server database 210 and may transmit a limited set of fields of the customer profile (or in some cases may transmit the entire customer profile) to the merchant's affinity system with a request to enroll the customer in the merchant's system using the universal ID as the identifier of the customer's account in that affinity system. Steps 518, 520 and 522 will then be performed as described above. As mentioned above, the profile sent to the merchant affinity system may be a limited one, i.e., not include all of the fields of the customer profile provided by the partner entity, in order to limit the amount of information about the customer to the various merchants. This may be desirable from a customer privacy standpoint. However, it is contemplated that at least the minimum amount of information required by the merchant to become a member in the merchant's affinity system will need to be transmitted. And the amount and types of information from the customer's profile that will need to be transmitted may differ from merchant to merchant. For example, some merchants may require a telephone number, whereas others may not.

Figure 6:
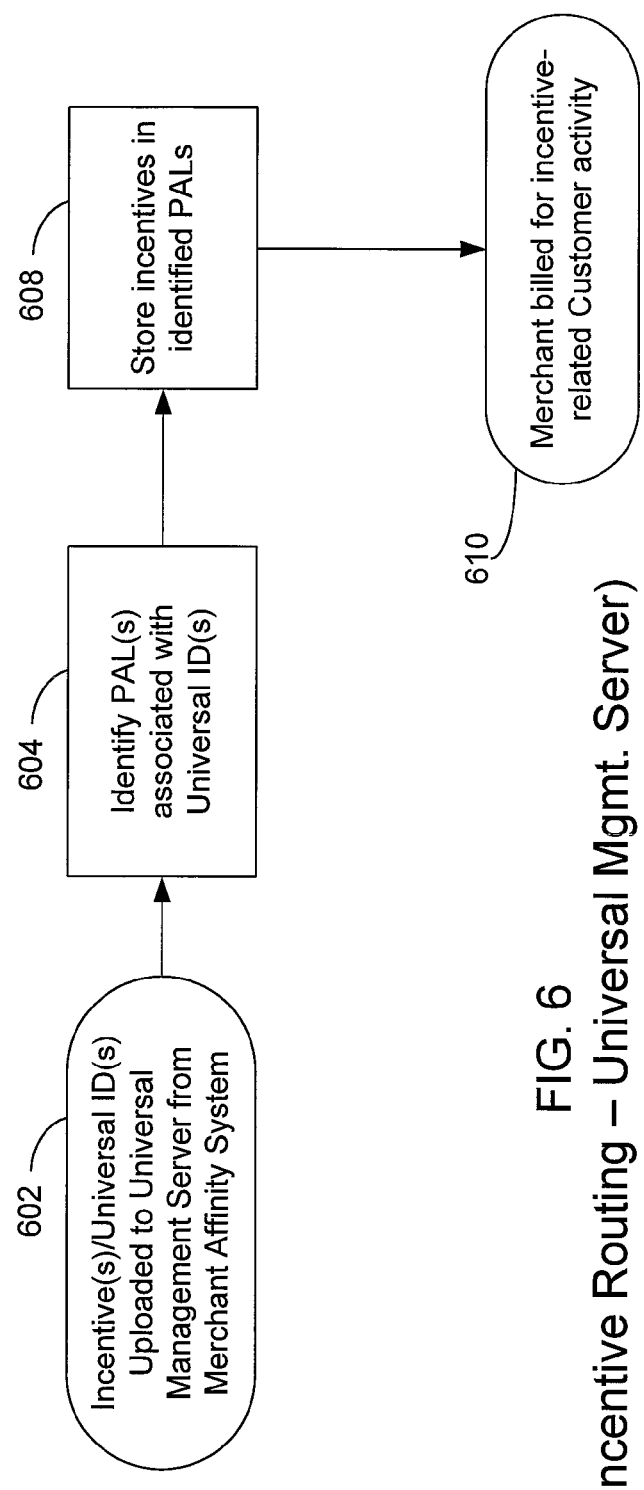
FIG. 6 is a flow diagram of one embodiment of a method of routing incentives on the universal management server.

FIG. 6 is a flow diagram of one embodiment of a method of routing incentives on the universal management server. The steps of FIG. 6 may, for example, be used to implement the incentive routing process 224 of FIG. 2. As shown in FIG. 6, the process begins at step 602 where the universal management server 102 receives from one of the participating merchants information representing one more incentives (e.g., advertisements, discounts, promotions, offers, etc.) and an identification of the universal ID(s) of the customer(s) who are to receive each such incentive. For example, the universal management server 102 may receive text and graphics defining an offer for a 10% discount on the purchase of a particular item from the merchant, along with a list of one hundred universal IDs of customers that the merchant's affinity system has determined should receive the offer. In other cases, the merchant may indicate that the incentive is to be provided to all customers of the universal affinity system. As mentioned above, transmission of the information about the incentive and the universal ID(s) may be performed electronically via the merchant interface 204. In other embodiments, the universal management server 102 may provide a web page (not shown) through which a representative of the merchant may manually upload or enter information about the incentive and/or universal IDs.

At steps 604 and 608, for each incentive, the universal management server 102 will then store the incentive (i.e., the information such as text and/or graphics defining the incentive) in the personal account lockers associated with each of the respective universal IDs received from the merchant. Thus, the merchant is able to target specific incentives to specific customers (universal IDs) or to broadcast an incentive to all customers. In one embodiment, the universal management server 102 may modify the format of the text and/or graphics representing the incentive so that the information may display properly when accessed by a customer via the web server 226.

In one embodiment, when a customer accesses the customer's PAL and views a particular incentive that has been uploaded to the PAL, the incentive may include an activation component (e.g., button, link, etc.) that the customer must "click" in order to activate the particular incentive being offered. In one embodiment, if the customer clicks on the activation component, information reflecting the customer's click may be transmitted back to the merchant that uploaded the incentive. The merchant's affinity system may then record the "activation" prior to the customer entering the store or merchant on-line shopping site and buying an item to which the incentive applies. For example, in this scenario, a customer may visit the customer's PAL and "click to activate" any incentive for an item they may be interested in buying from a particular merchant. Information reflecting that click may then be relayed to the merchant's affinity system and the offered incentive may then become "pending until expired" on the merchant's affinity/POS system. Should the customer visit the merchant and buy the item (either at a retail location or online) before the offered incentive expires, then the customer would be entitled to enjoy the benefit of the incentive. A customer who does not click to activate a given incentive may not be able to enjoy the benefit of that particular incentive, i.e., activation may be required for that incentive.

In one embodiment, whenever a customer links over to the on-line shopping site of a merchant in order to purchase an item for which an incentive was provided, the customer may be required by the merchant to enter the customer's universal ID in order to identify the customer in the merchant's affinity system. However, in other embodiments, the account information maintained by the merchant for the customer may include, in addition to the customer's universal ID, one or more web (i.e., computer) addresses used by the customer when linking to the merchant's online shopping site. For example, the customer's home computer may have one address, and the customer's laptop computer may have another address. With typical protocols (e.g., HTTP, TCP/IP) the address of the computer the customer is using may be passed to the merchant when the user links to the merchant's on-line shopping site. If the merchant maintains a record of this address information in the customer's account in the merchant's affinity system, the merchant may then be able to identify the customer without requiring the customer to enter the customer's universal ID.

As a source of revenue for the management entity, the merchant and/or the partner entity that issued the universal ID to a particular customer may be billed for the activity associated with uploading, storage and display of incentives via a customer's personal account locker. The merchant may be billed differently depending on whether a particular customer was flagged as a new member or an existing member of that merchant's affinity system. The amount billed may be higher for new members, as there is additional value to the merchant of having new customers signed up in its affinity system. Also, the merchant may be billed based on actual activity of customers in response to the incentives.

Figure 7:
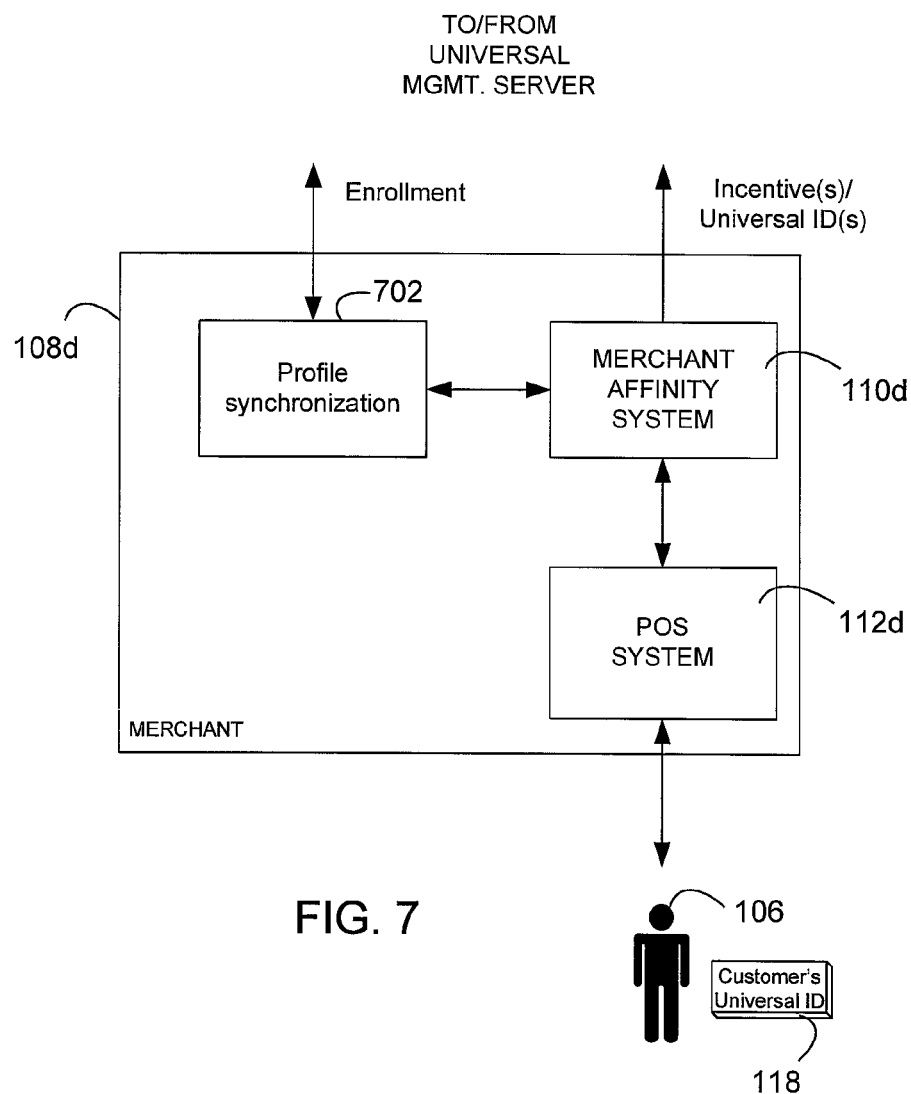
FIG. 7 is a block diagram of one embodiment of systems implemented at a merchant location.

FIG. 7 is a block diagram of one embodiment of systems implemented at a merchant location. While it may be preferable to minimize the degree to which the merchant's affinity and/or POS systems may need to be modified to work in the context of the universal affinity system 100 and to minimize the need for any additional software, in some embodiments additional software may be required. For example, as shown in FIG. 7, software 702 for performing the customer profile synchronization (i.e., field matching) process described above (i.e., steps 510-516 of FIG. 5) may be needed at a particular merchant site 108d. The software may interact with the merchant's affinity system 10d in the manner described above. However, in any event, the merchant is not required to share any of its affinity or transaction data from its affinity system 10d or POS system 112d with any other entity, including the universal management server 102.

Figure 8:
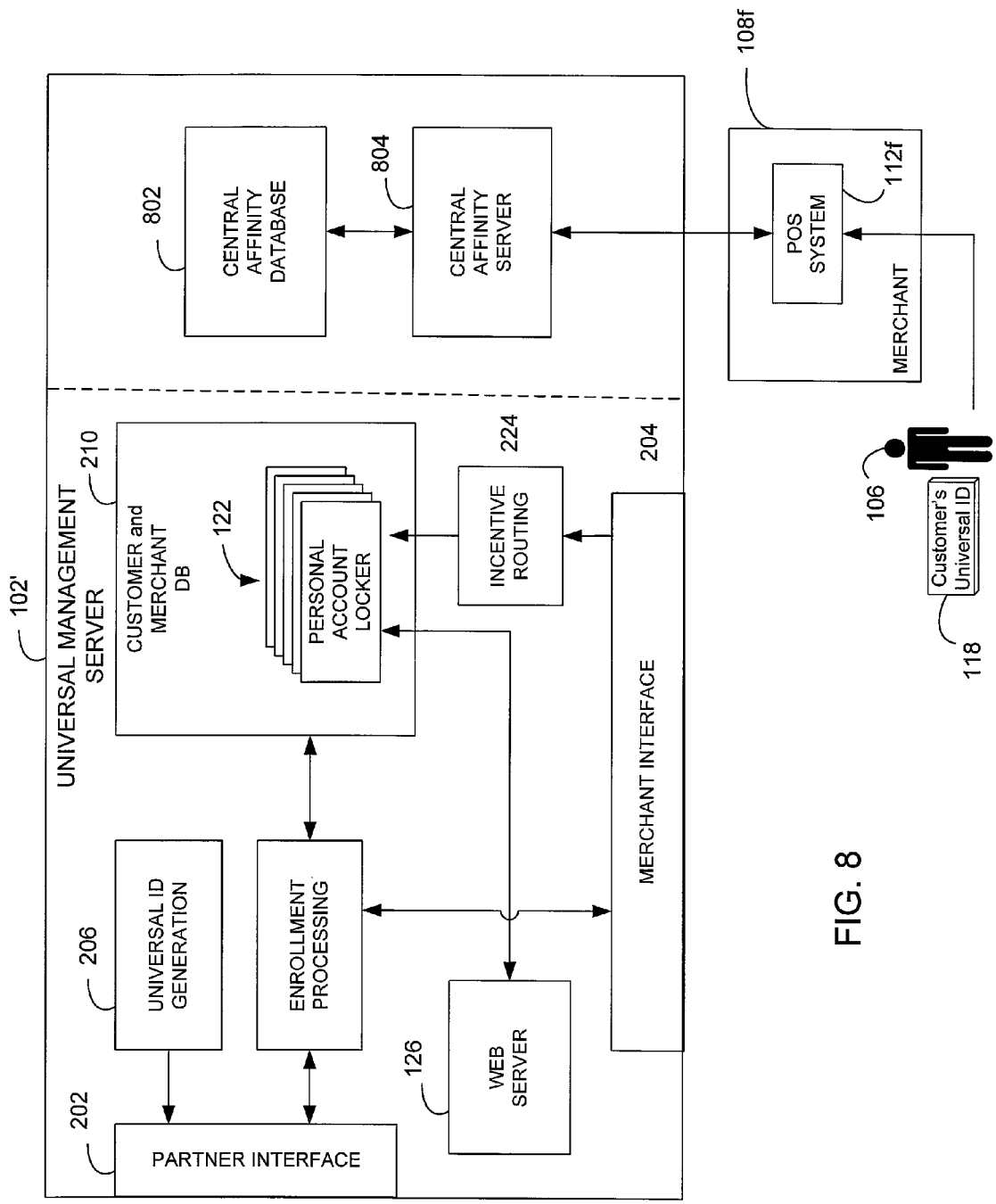
FIG. 8 is a block diagram of another embodiment of the universal management server.

FIG. 8 is a block diagram of another embodiment 102' of the universal management server. In this embodiment, in addition to providing all of the capabilities of the universal affinity system 100 described above, the universal management server 102' also provides a centralized affinity processing capability to be used by merchants who do not have merchant affinity systems of their own. Thus, this capability may be offered as a separate service to such merchants. However, the universal IDs of customers will be recognized by the system just as they are by merchants participating in the universal affinity system 100. The centralized affinity processing capability may be implemented by a central affinity server 804 that performs the affinity processing on behalf of a merchant 108f and an associated central affinity database 802. In one embodiment, the central affinity server and central affinity database may be implemented in the same manner (i.e., using the same hardware and/or software) as any of the merchant affinity systems 110a, 110b . . . 110d. Such affinity processing systems are available from a variety of vendors.

In one embodiment, the customer information stored in the central affinity database 802 may be linked to the personal account lockers 122 of the universal management server database 210. The central affinity server 804 may be configured to communicate directly with the POS system 112f of the merchant 108f through an always-on communications link. Having a direct link between the central affinity server 804 and the POS system 112f is typically disfavored by merchants already having an affinity program server 18. In the case of merchants who do not have existing affinity servers, however, a direct communication link represents a reasonable tradeoff to the cost of purchasing and installing their own affinity program server. In one embodiment, the central affinity server 804 and central affinity database 802 may be implemented and operate with merchants, like merchant 108f, in the manner that the server 10b, the computing application 180 executing on the server 10b, and the database 320 operate as described in FIGS. 5-7 of co-pending application Ser. No. 10/461,659, filed Jun. 13, 2003, the contents of which application are hereby incorporated by reference in their entirety.

Figure 9:
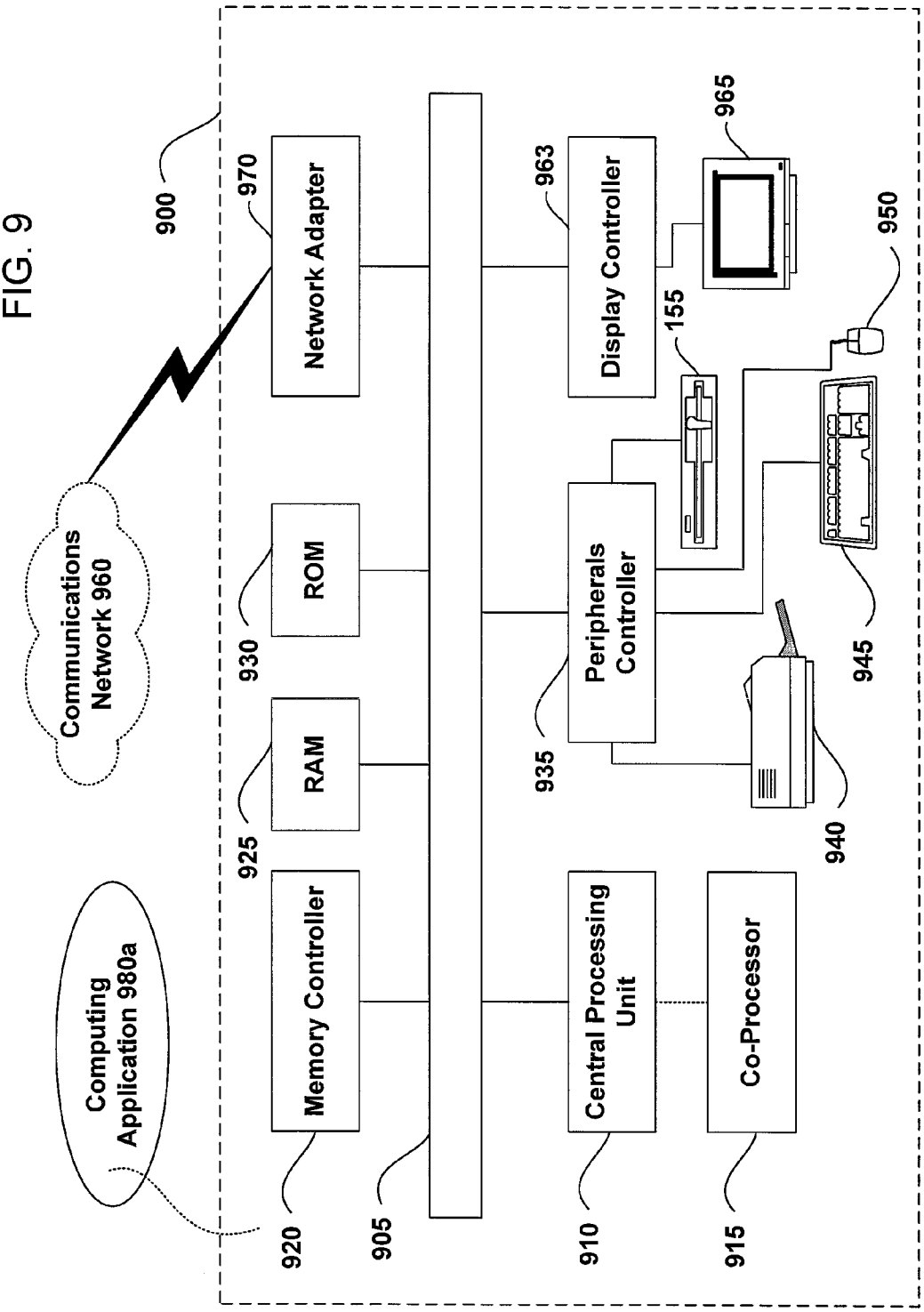
FIG. 9 is a block diagram of an exemplary computing system.

FIG. 9 is a block diagram of an exemplary computing system on which, for example, the universal management server 902 and partner server 300 and their respective functions may be implemented. Computing system 900 is controlled primarily by computer readable instructions, which may be in the form of software, wherever, or by whatever means such software is stored or accessed. Such computer readable instructions may be executed within central processing unit (CPU) 910 to cause computing system 900 to do work. In many known workstations and personal computers, central processing unit 910 is implemented by a single-chip CPU called a microprocessor. In other machines, the central processing unit 900 may comprise multiple processors. Coprocessor 915 is an optional processor, distinct from main CPU 910, that performs additional functions or assists CPU 910.

In operation, CPU 910 fetches, decodes, and executes instructions, and transfers information to and from other resources via the computer's main data-transfer path, system bus 905. Such a system bus connects the components in computing system 900 and defines the medium for data exchange. System bus 905 typically includes data lines for sending data, address lines for sending addresses, and control lines for sending interrupts and for operating the system bus. An example of such a system bus 905 is the PCI (Peripheral Component Interconnect) bus.

Memory devices coupled to system bus 905 include random access memory (RAM) 925 and read only memory (ROM) 930. Such memories include circuitry that allows information to be stored and retrieved. ROMs 930 generally contain stored data that cannot easily be modified. Data stored in RAM 925 can be read or changed by CPU 910 or other hardware devices. Access to RAM 925 and/or ROM 930 may be controlled by memory controller 920. Memory controller 920 may provide an address translation function that translates virtual addresses into physical addresses as instructions are executed. Memory controller 920 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 900 may contain peripherals controller 935 responsible for communicating instructions from CPU 910 to peripherals, such as, printer 940, keyboard 945, mouse 950, and disk drive 955.

Display 965, which is controlled by display controller 963, is used to display visual output generated by computing system 900. Such visual output may include text, graphics, animated graphics, and video. Display 965 may be implemented with a CRT-based video display, an LCD-based flat-panel display, gas plasma-based flat-panel display, or a touch-panel. Display controller 963 includes electronic components required to generate a video signal that is sent to display 965.

Further, computing system 900 may contain network adaptor 970 that may be used to connect computing system 900 to an external communications network 960. Communications network 960 may provide computer users with means of communicating and transferring information electronically. Communications network 960 also may include but is not necessarily limited to fixed-wire local area networks (LANs), wireless LANs, fixed wire wide-area-networks (WANs), wireless WANs, fixed wire extranets, wireless extranets, fixed-wire intranets, wireless intranets, fixed wire and wireless peer-to-peer networks, fixed wire and wireless virtual private networks, the Internet, and the wireless Internet. Additionally, communications network 960 may provide distributed processing, which involves several computers and the sharing of workloads or cooperative efforts in performing a task. It will be appreciated that the network connections shown are exemplary and that other means of establishing a communications link between the computers may be used.

It is understood that any or all of the systems, methods and processes of the universal affinity system described herein may be embodied in the form of computer executable instructions (i.e., program code) stored on a computer-readable storage medium which instructions, when executed by a machine, such as a computer, perform and/or implement the systems, methods and processes described herein. Specifically, any of the steps, operations or functions described above that are performed either at a partner entity or at the universal management server may be implemented in the form of such computer executable instructions. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer.

Changes may be made to the above-described embodiments of the invention without departing from the broad inventive concept thereof. This invention is not limited to the particular embodiments disclosed but is intended to cover all modifications which are in the spirit and scope of the invention as defined by the appended claims.

What is claimed:

1. A method for providing to customers universal access to affinity systems of a plurality of merchants, wherein each merchant is able to operate its own affinity system without sharing information about transactions between the merchant and said customers, the method comprising, at a universal management server:
   receiving requests from said customers, each request from a customer comprising a request to activate a respective universal identifier issued to the customer, and in response to each such request:
      allocating memory on the universal management server, the allocated memory defining a personal account locker for the customer, and
      automatically enrolling the customer in the affinity systems of one or more merchants using the same universal identifier of the customer to enroll the customer in each merchant affinity system, and thereafter;
   receiving from one of said merchants a targeted discount offer and the universal identifier corresponding to each customer in a set of targeted customers who are enrolled in the affinity system of that merchant and in response;
      storing the targeted discount offer in the personal account lockers of each customer in the set of targeted customers.

2. The method of claim 1, wherein the customers are customers of one or more entities that partner with an entity that manages said universal management server, and wherein the universal management server receives said customer requests to activate their respective universal identifiers from respective servers operated by each of said partner entities.

3. The method of claim 2, further comprising allocating a plurality of universal identifiers to each of said one or more partner entities, each partner entity issuing the universal identifiers allocated to it to its respective customers.

4. The method of claim 2, wherein one of said partner entities comprises a credit card issuer, a debit card issuer, a mobile telephone service provider, an automobile manufacturer, a bank or other service provider.

5. The method of claim 2, further comprising, at one of said partner entities:
   hosting a web site to which a customer of the partner entity may log on; and
   providing a link from the web site hosted by the partner entity to the personal account locker on the universal management server, whereby the personal account locker of the customer appears to be a part of the web site hosted by the partner entity.

6. The method of claim 1, further comprising:
   providing each customer in the set of targeted customers access to the targeted discount offer stored in the customer's personal account locker;
   activating, in at least one of the personal account lockers, the targeted discount offer; and
   in response to the activation, sending to the affinity system of the merchant that provided the discount offer an indication that the discount offer is activated by the customer.

7. The method of claim 6, wherein said access is provided via a web-based interface.

8. The method of claim 1, wherein each universal identifier comprises a pre-existing identifier of the customer.

9. The method of claim 1, wherein each request from one of said customers to activate the customer's universal identifier is accompanied by a profile of said customer comprising fields of information about the customer, and wherein automatically enrolling the customer in the affinity system of one of said merchants comprises:
   successively sharing fields of information from the customer's profile with the merchant's affinity system until either the customer is determined to have an existing account in the merchant's affinity system or the customer is determined not to have an existing account;
   if the customer is determined to have an existing account in the merchant's affinity system, causing the customer's universal identifier to be associated with the existing account so that it is accepted by the merchant as an identifier of the customer within the merchant's affinity system; and
   if the customer is determined not to have an existing account in the merchant's affinity system, causing a new account to be created for the customer in the merchant's affinity system and causing the customer's universal identifier to be associated with the new account so that it is accepted by the merchant as an identifier of the customer within the merchant's affinity system.

10. A universal management server for providing to customers universal access to affinity systems of a plurality of merchants, wherein each customer is issued a respective unique universal identifier, the universal management server comprising a processor and a memory and being configured to:

> receive requests from the customers to activate their respective universal identifiers, and in response to each such request:
>> allocate memory on the universal management server, the allocated memory defining a personal account locker for the customer, and
>> automatically enroll the customer in the affinity systems of one or more merchants using the same universal identifier of the customer to enroll the customer in each merchant affinity system, and thereafter;
>
> receive from one of said merchants a targeted discount offer and the universal identifier corresponding to each customer in a set of targeted customers who are enrolled in the affinity system of that merchant and in response;
> store the targeted discount offer in the personal account lockers of each customer in the set of targeted customers.

11. The universal management server of claim 10, wherein the server is operated by a first entity, wherein the customers are customers of a different entity that partners with the first entity, and wherein the first entity allocates to the partner entity a plurality of universal identifiers and the partner entity issues the respective universal identifiers to each of its customers.

12. The universal management server of claim 11, wherein the customer requests to activate their respective universal identifiers are received from the partner entity on behalf of the customers.

13. The universal management server of claim 10, wherein the universal management server further comprises:

> a web server that provides each customer in the set of targeted customers access to the targeted discount offer stored in the customer's personal account locker, and wherein the universal management server further operates to:
>> activate, in at least one of the personal account lockers, the targeted discount offer; and
>> in response to the activation, sending to the affinity system of the merchant that provided the discount offer an indication that the discount offer is activated for the customer associated with said at least one personal account locker in which the discount offer was activated.

14. The universal management server of claim 10, wherein each universal identifier comprises a pre-existing identifier of the customer.

15. The universal management server of claim 10, wherein the request from each of said customers to activate the customer's universal identifier is accompanied by a profile of said customer comprising fields of information about the customer, and wherein the server automatically enrolls the customer in the affinity system of one of said merchants by:

> successively sharing fields of information from the customer's profile with the merchant's affinity system until either the customer is determined to have an existing account in the merchant's affinity system or the customer is determined not to have an existing account;
> if the customer is determined to have an existing account in the merchant's affinity system, causing the customer's universal identifier to be associated with the existing account so that it is accepted by the merchant as an identifier of the customer within the merchant's affinity system; and
> if the customer is determined not to have an existing account in the merchant's affinity system, causing a new account to be created for the customer in the merchant's affinity system and causing the customer's universal identifier to be associated with the new account so that it is accepted by the merchant as an identifier of the customer within the merchant's affinity system.

16. The universal management server of claim 11, wherein said partner entity comprises one of a credit card issuer, a debit card issuer, a mobile telephone service provider, an automobile manufacturer, a bank or other service provider.

17. The universal management server of claim 11, wherein the universal management server is configured to communicate with a second server at said partner entity that hosts a web site to which a customer of the partner entity may log on and that provides a link from the web site hosted by the partner entity to the personal account locker of that customer on the universal management server, whereby the personal account locker of the customer appears to be a part of the web site hosted by the partner entity.

18. A non-transitory computer-readable medium having stored thereon instructions which, when executed by a computer, enable the computer provide to customers universal access to affinity systems of a plurality of merchants, wherein each merchant is able to operate its own affinity system without sharing information about transactions between the merchant and said customers, the instructions further causing the computer to:

> receive requests from said customers, each request from a customer comprising a request to activate a respective universal identifier issued to the customer, and in response to each such request:
>> allocate memory on the universal management server, the allocated memory defining a personal account locker for the customer, and
>> automatically enroll the customer in the affinity systems of one or more merchants using the same universal identifier of the customer to enroll the customer in each merchant affinity system, and thereafter;
>
> receive from one of said merchants a targeted discount offer and the universal identifier corresponding to each customer in a set of targeted customers who are enrolled in the affinity system of that merchant and in response;
> store the targeted discount offer in the personal account lockers of each customer in the set of targeted customers.

19. The non-transitory computer readable medium of claim 18, wherein the customers are customers of one or more entities that partner with an entity that manages said universal management server, and wherein the computer receives said customer requests to activate their respective universal identifiers from respective computers of each of said partner entities.

20. The non-transitory computer readable medium of claim 18, wherein the instructions further cause the computer to:

> provide each customer in the set of targeted customers access via a web-based interface to the targeted discount offer stored in the customer's personal account locker;
> activate, in at least one of the personal account lockers, the targeted discount offer; and
> in response to the activation, send to the affinity system of the merchant that provided the discount offer an indication that the discount offer is activated for the customer associated with said at least one personal account locker in which the discount offer was activated.

21. The non-transitory computer readable medium of claim 18, wherein each request from one of said customers to activate the customer's universal identifier is accompanied by a profile of said customer comprising fields of information about the customer, and wherein the instructions that cause the computer to automatically enroll the customer in the affinity system of one of said merchants further cause the computer to:

successively share fields of information from the customer's profile with the merchant's affinity system until either the customer is determined to have an existing account in the merchant's affinity system or the customer is determined not to have an existing account;

if the customer is determined to have an existing account in the merchant's affinity system, cause the customer's universal identifier to be associated with the existing account so that it is accepted by the merchant as an identifier of the customer within the merchant's affinity system; and if the customer is determined not to have an existing account in the merchant's affinity system, causing a new account to be created for the customer in the merchant's affinity system and cause the customer's universal identifier to be associated with the new account so that it is accepted by the merchant as an identifier of the customer within the merchant's affinity system.

* * * * *